US012116132B2

(12) United States Patent
Jha et al.

(10) Patent No.: US 12,116,132 B2
(45) Date of Patent: Oct. 15, 2024

(54) AIRCRAFT PASSENGER READING LIGHT

(71) Applicant: Goodrich Lighting Systems GmbH & Co. KG, Lippstadt (DE)

(72) Inventors: Anil Kumar Jha, Lippstadt (DE); Andre Hessling von Heimendahl, Koblenz (DE); Jörg Müller, Lippstadt (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 0 days.

(21) Appl. No.: 18/176,277

(22) Filed: Feb. 28, 2023

(65) Prior Publication Data

US 2023/0286652 A1 Sep. 14, 2023

(30) Foreign Application Priority Data

Mar. 8, 2022 (EP) ..................... 22160818

(51) Int. Cl.
| | |
|---|---|
| *B64D 11/00* | (2006.01) |
| *F21V 5/04* | (2006.01) |
| *F21V 14/02* | (2006.01) |
| *F21V 14/06* | (2006.01) |
| *B60Q 3/44* | (2017.01) |

(Continued)

(52) U.S. Cl.
CPC .............. *B64D 11/00* (2013.01); *F21V 5/045* (2013.01); *F21V 14/02* (2013.01); *F21V 14/06* (2013.01); *B60Q 3/44* (2017.02); *B64D 2011/0053* (2013.01); *B64D 2203/00* (2013.01); *F21W 2106/00* (2018.01); *F21W 2107/30* (2018.01); *F21Y 2115/10* (2016.08)

(58) Field of Classification Search
CPC ............ B64D 11/00; B64D 2011/0053; B64D 2203/00; F21V 5/045; F21V 14/02; F21V 14/06; B60Q 3/44; F21W 2106/00; F21W 2107/30
See application file for complete search history.

(56) References Cited

U.S. PATENT DOCUMENTS

| | | |
|---|---|---|
| 4,899,265 A | 2/1990 | Maglica |
| 6,578,994 B1 | 6/2003 | Beyerlein |

(Continued)

FOREIGN PATENT DOCUMENTS

| | | |
|---|---|---|
| EP | 1449718 | 7/2008 |
| EP | 3566948 | 8/2021 |

OTHER PUBLICATIONS

European Patent Office, European Search Report dated Sep. 5, 2022 in Application No. 22160818.5.

*Primary Examiner* — Tracie Y Green
*Assistant Examiner* — Michael Chiang
(74) *Attorney, Agent, or Firm* — SNELL & WILMER L.L.P.

(57) ABSTRACT

An aircraft passenger reading light, which is operable in at least two predetermined configurations, comprises: a light source; an optical element; and an actuation mechanism, which is configured to modify a distance between the light source and the optical element. The distance (D) between the light source and the optical element differs in the at least two predetermined configurations and a spatial extension of the illumination, which results from the light output of the light source and the optical element, differs in the at least two predetermined configurations.

13 Claims, 7 Drawing Sheets

(51) Int. Cl.
*F21W 106/00* (2018.01)
*F21W 107/30* (2018.01)
*F21Y 115/10* (2016.01)

(56) References Cited

U.S. PATENT DOCUMENTS

| | | |
|---|---|---|
| 7,150,548 B2 | 12/2006 | Kohlmeier-Beckmann et al. |
| 8,439,533 B2 | 5/2013 | Heym et al. |
| 9,045,079 B2 | 6/2015 | Boomgarden et al. |
| 2004/0196666 A1 | 10/2004 | Bina et al. |
| 2006/0039160 A1* | 2/2006 | Cassarly ............ G02B 27/0961 362/551 |
| 2011/0080736 A1* | 4/2011 | Brands ................... F21L 4/005 362/277 |
| 2012/0147606 A1* | 6/2012 | Huang ................... F21V 17/02 362/277 |
| 2014/0049967 A1* | 2/2014 | Zhou ........................ F21K 9/23 362/287 |
| 2014/0192544 A1 | 7/2014 | Orson et al. |
| 2018/0080634 A1* | 3/2018 | Huang ................... F21V 14/06 |
| 2019/0313497 A1 | 10/2019 | Wolfing et al. |
| 2019/0344891 A1* | 11/2019 | Hakla ................... B64D 11/00 |

* cited by examiner

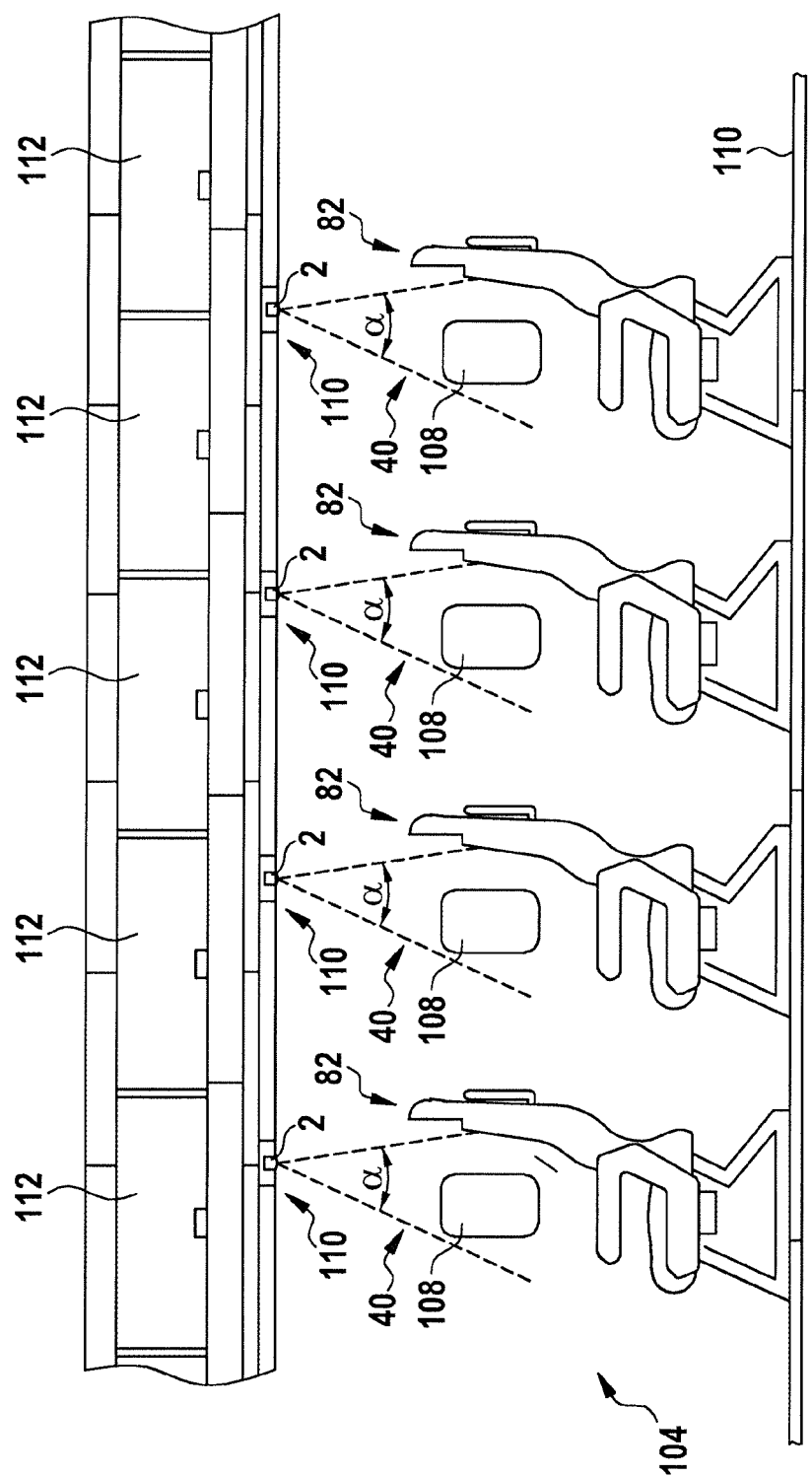

AIRCRAFT PASSENGER READING LIGHT

CROSS-REFERENCE TO RELATED APPLICATIONS

This application claims priority to, and the benefit of, EP Patent Application No. 22160818.5, filed Mar. 8, 2022 and titled "AIRCRAFT PASSENGER READING LIGHT (DAS code 7F47)," which is incorporated by reference herein in its entirety for all purposes.

FIELD

The present invention is in the field of interior aircraft lights. The present invention is in particular related to aircraft passenger reading lights.

BACKGROUND

Passenger aircraft, such as commercial airplanes, usually have a passenger cabin comprising a plurality of passenger seats and a plurality of aircraft passenger reading lights. The aircraft passenger reading lights are commonly arranged above the passenger seats, in order to allow passengers, sitting in the passenger seats, to read even if the illumination within the passenger cabin is dimmed low or switched off.

In order to provide a convenient illumination to the passengers, the aircraft passenger reading lights are adapted to the geometry of the passenger cabin of the aircraft in which they are installed and/or adapted to the particulars of the seating zone in which they are installed. The aircraft passenger reading lights are in particular adapted to the spatial distance between the aircraft passenger reading lights and the associated passenger seats. In consequence, different types of aircraft passenger reading lights are installed in different types of aircraft and/or in seating zones with different seating configurations.

Accordingly, it would be beneficial to provide an aircraft passenger reading light which has a wide application range and which may work effectively in different aircraft types and/or different seating configurations.

SUMMARY

Exemplary embodiments of the invention include an aircraft passenger reading light that is operable in at least two predetermined configurations and comprises: a light source; an optical element; and an actuation mechanism, which is configured to modify a distance between the light source and the optical element. In an aircraft passenger reading light according to an exemplary embodiments of the invention, the distance between the light source and the optical element differs in the at least two predetermined configurations. In consequence, the light output of the aircraft passenger reading light and, in particular, a spatial extension of the illumination, which results from the light output of the light source and the optical element, differs in the at least two predetermined configurations.

Further in particular, the size/extension of an area, which is illuminated by the light output of the aircraft passenger reading light, when directed onto a plane, which is arranged at a given distance from the aircraft passenger reading light, differs in the at least two predetermined configurations.

As a result, an aircraft passenger reading light according to an exemplary embodiment of the invention may be adapted easily to different geometries of the passenger cabin, in particular to different distances between the aircraft passenger reading light and a passenger seat, which is associated with the aircraft passenger reading light. In consequence, aircraft passenger reading lights according to exemplary embodiments of the invention may be employed easily in different kinds of aircraft, in particular in aircraft in which the geometries of the aircraft passenger cabins are different, and/or in seating zones with different seating configurations. In particular, as compared to previous approaches, less types of aircraft passenger reading lights may be used for equipping different kinds of aircraft and/or for equipping different seating configurations of an aircraft. For example, it is possible that a single type of aircraft passenger reading light in accordance with an exemplary embodiment of the invention is used for passenger seats in an economy class configuration, where an overhead baggage compartment is present and the distance between the aircraft passenger reading light and the passenger seat is comparably small, as well as for passenger seats in a business class configuration, where no overhead baggage compartment is present and the distance between the aircraft passenger reading light and the passenger seat is comparably large.

An aircraft passenger reading light according to an exemplary embodiment of the invention may comprise more than one light source and/or more than one optical element. By employing more than one light source, the total light output provided by the aircraft passenger reading light may be increased. Employing more than one optical element may help to adjust the light output, provided by the aircraft passenger reading light, to the respective needs.

In an embodiment, the light output may be a light cone, and the opening angle of the light output may be different in the at least two predetermined configurations. In consequence, in the at least two predetermined configurations, areas having different sizes will be illuminated at a given distance from the aircraft passenger reading light.

In an embodiment, the aircraft passenger reading light further comprises a housing and the actuation mechanism includes an actuation member, which is rotatable with respect to the housing. The actuation member may be mechanically coupled with the optical element and/or with the light source, such that rotation of the actuation member modifies the distance between the light source and the optical element. Thus, the distance between the light source and the optical element may be modified easily by rotating the actuation member with respect to the housing for changing the light output of the aircraft passenger reading light.

In an embodiment, the rotation of the actuation member causes a linear movement of the optical element and/or of the light source in a longitudinal direction, wherein the axis of rotation of the actuation member may in particular coincide with the longitudinal direction. Changing the distance between the optical element and the light source in a longitudinal direction may change the light output, provided by the aircraft passenger reading light, in a particularly effective manner.

In an embodiment, the actuation member includes a tubular actuation member, and the optical element and/or the light source is/are arranged at least partly within said tubular actuation member. The optical element and/or the light source may be configured to move in a linear manner along the axis of the tubular actuation member. Such a configuration may result in a compact actuation mechanism, which does not considerably increase the space needed for the aircraft passenger reading light.

In an embodiment, the tubular actuation member comprises a circumferential wall and a slot, which is formed within the circumferential wall of the tubular actuation member. The slot may in particular be inclined with respect to the longitudinal direction. A guide member, which is mechanically coupled with the optical element or with the light source, may extend into said slot, causing the guide member to move within the slot, when the tubular actuation member is rotated.

In an embodiment, the aircraft passenger reading light further comprises a guiding assembly, which may include at least one longitudinal guide member and at least one corresponding guiding structure, which may be provided at the optical element and/or at a support structure of the light source and which may engage with the at least one longitudinal guide member. The guiding assembly may guide the optical element and/or the support structure of the light source linearly along the at least one longitudinal guide member and prevent the optical element and/or the light source from rotating together with the tubular actuation member.

The combination of a slot, which is inclined with respect to the longitudinal direction and which accommodates a guide member that is mechanically coupled with the optical element and/or the light source, and a guiding assembly, which prevents the optical element and/or the light source from rotating, may result in a very effective, robust and space saving actuation mechanism of a bayonet type.

In an embodiment, the guide member is at least partially elastically deformable. The guide member may in particular be elastically deformed, when it is accommodated within the slot. In such a configuration, the guide member may be securely accommodated within the slot. The elasticity of the guide member may in particular avoid any shaky play of the guide member within the slot, which may be caused by tolerances of the dimensions of the slot and/or of the guide member.

The guide member may be at least partially made of an elastic material, and/or it may comprise components, which are elastically mounted to a main body of the guide member. The components may include wing-type elastic extensions or protrusions, which extend from the main body of the guide member.

In an embodiment, at least two dents are formed at different positions along the slot for accommodating the guide member. Each dent may define a predetermined position of the guide member within the slot. Each position may in particular correspond to a respective one of the at least two predetermined configurations of the aircraft passenger reading light. Thus, in such an embodiment, the aircraft passenger reading light may be reliably switched between at least two predetermined configurations by moving the guide member between the different dents, which are formed along the slot. In consequence, the different predetermined configurations of the aircraft passenger reading light may be selected easily and reliably. The dents may prevent the guide member from accidentally moving out of the predetermined position into which it has been moved.

In an embodiment, the tubular actuation member is arranged within the housing, with the tubular actuation member being accessible only from inside the tubular actuation member.

The tubular actuation member and the housing may in particular be configured such that a person, which intends to rotate the tubular actuation member, needs to press his/her fingers against the tubular actuation member from inside the tubular actuation member. Since such a procedure for rotating the tubular actuation member is not obvious/intuitive to persons, who are not authorized and trained for rotating the tubular actuation member, the risk of an accidental and/or unauthorized rotation of the tubular actuation member, in particular the risk of an unauthorized modification of the configuration of the light output of the aircraft passenger reading light, is considerably reduced.

In a further embodiment, a specific tool, which is configured for engaging with the tubular actuation member, may be used or required to be used for rotating the tubular actuation member. In such an embodiment, it is not possible to rotate the tubular actuation member by hand, i.e. without using the specific tool. As a result, the risk of an unauthorized modification of the configuration of the light output of the aircraft passenger reading light may be reduced even further.

In an embodiment, the light source is an LED or the light source includes one or more LEDs. LEDs provide reliable and efficient light sources at low costs. Using a plurality of LEDs may allow increasing the light output provided by the aircraft passenger reading light. Selectively operating a plurality of LEDs, which emit light of different colors, may allow changing the color of the light, which is output by the aircraft passenger reading light.

In an embodiment, the optical element includes at least one lens. The optical element may in particular include at least one Fresnel lens. A lens, in particular a Fresnel lens, may be a very effective optical element for transforming the light emission, which is provided by the light source, into the desired light output. A lens/Fresnel lens may allow for forming a light output, in particular a light beam, which has a defined opening angle. Alternatively or additionally, the optical element may comprise one or more reflectors and/or one or more shutters.

Exemplary embodiments of the invention also include a passenger service unit, in particular an overhead passenger service unit, which may be arranged over one or more passenger seats within a passenger cabin of an aircraft. The passenger ser-vice unit comprises at least one aircraft passenger reading light according to an exemplary embodiment of the invention. Such passenger service units may be in-stalled in different types of aircraft, in particular in different types of aircraft, in which the distances between the aircraft passenger reading lights and the associated passenger seats differ. The light output provided by the at least one aircraft passenger reading light, which is installed within the passenger service unit, may be easily adapted to the different distances between the aircraft passenger reading lights and the associated passenger seats. Also, when the passenger service unit is re-located from a first kind of seating configuration, such as a seating configuration with overhead baggage compartments, to a second kind of seating configuration, such as a seating configuration without overhead baggage compartments, the at least one aircraft passenger reading light may be conveniently adapted to the altered geometry of the seating configuration. The additional features, modification and effects, described above with respect to the aircraft passenger reading light, apply to the passenger service unit in an analogous manner.

Exemplary embodiments of the invention further include an aircraft, such as an airplane or a helicopter, which comprises at least one aircraft passenger reading light according to an exemplary embodiment of the invention and/or at least one passenger service unit according to an exemplary embodiment of the invention. The additional features, modification and effects, described above with respect to the aircraft passenger reading light, apply to the aircraft in an analogous manner.

Exemplary embodiments of the invention also include a method of adjusting a light output of an aircraft passenger reading light according to an exemplary embodiment of the invention, wherein the method includes changing the distance between the optical element and the light source from a first predetermined distance to a second predetermined distance via the actuation mechanism. The method may in particular include changing the distance between the optical element and the light source from the first predetermined distance to the second predetermined distance by rotating the actuation member with respect to the housing.

According to an embodiment, the first and second predetermined distances are de-fined by the mechanical structure of the aircraft passenger reading light.

In an embodiment, the method includes employing a specific tool, which is configured for engaging with the tubular actuation member, for rotating the tubular actuation member. Such a tool may facilitate the rotation of the tubular actuation member. It may in particular not be possible to rotate the tubular actuation member with-out using the specific tool or a similar device. In such an embodiment, an unauthorized modification of the configuration of the light output of the aircraft passenger reading light may be prevented very reliably.

Exemplary embodiments of the invention further include a method of adjusting the light output of at least one aircraft passenger reading light. The method may in particular include adjusting the light output of a plurality of aircraft passenger reading lights within a passenger cabin of an aircraft as part of a re-configuration of the seating map within the passenger cabin or as part of relocating the reading lights and/or passenger service units within the passenger cabin.

Relocating the aircraft passenger reading lights and/or passenger service units with-in the passenger cabin may in particular be part of a re-configuration of at least a portion of the passenger cabin of the aircraft from a business class configuration, in which there a no overhead baggage bins, to an economy class configuration, in which overhead baggage bins are installed over the passenger seats, or vice versa.

Relocating the aircraft passenger reading lights and/or passenger service units may include moving the aircraft passenger reading lights and/or passenger service units from a business class section of the passenger cabin of the aircraft to an economy class section of the passenger cabin, or vice versa.

BRIEF DESCRIPTION OF THE DRAWINGS

Further exemplary embodiments of the invention are described below with respect to the accompanying drawings, wherein:

FIG. 2A shows a schematic longitudinal cross-sectional view of a section of a passenger cabin of the aircraft shown in FIG. 1.

DETAILED DESCRIPTION

Figure 1:
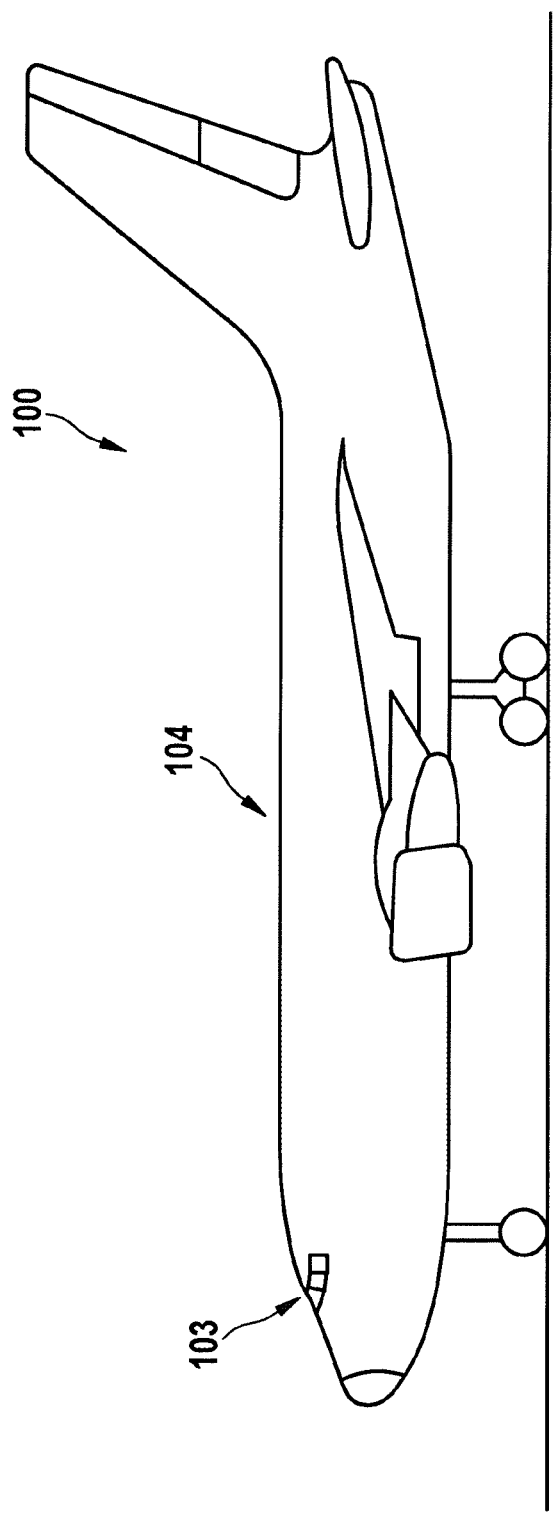
FIG. 1 depicts a schematic side view of an aircraft, in particular of an air plane, which may be equipped with an aircraft passenger reading light in accordance with an exemplary embodiment of the invention.

FIG. 1 depicts a schematic side view of an aircraft 100, in particular of an airplane, in accordance with an exemplary embodiment of the invention. In the exemplary embodiment shown in FIG. 1, the aircraft 100 is a large passenger airplane comprising a cockpit 103 and a passenger cabin 104. The aircraft 100 may be a commercial passenger airplane, a private airplane, or a military aircraft. It is also possible that a passenger reading light according to an exemplary embodiment of the invention is implemented in a rotorcraft, such as a helicopter.

FIG. 2A shows a schematic longitudinal cross-sectional view of a section of the passenger cabin 104 of the aircraft 100 shown in FIG. 1.

Four seats 82, also referred to as passenger seats 82, are shown in FIG. 2A. The passenger seats 82 are mounted to the floor 110 of the passenger cabin 104. Each of the depicted passenger seats 82 belongs to a different seat row.

For each of the seat rows, a window 108 is provided, which allows the passengers to view the outside of the aircraft 100. Further, a plurality of overhead baggage compartments 112 are shown. The overhead baggage compartments 112 provide storage space for the passengers' baggage.

Each seat row includes a plurality, for example two or three, passenger seats 82, which are arranged next to each other, perpendicular to the viewing plane of FIG. 2A. The additional passenger seats 82 of each seat row are not visible in FIG. 2A, as they are arranged behind and therefore hidden by the depicted first passenger seats (aisle seats) 82 of each seat row.

Passenger service units ("PSUs") 110 comprising aircraft passenger reading lights 2 according to exemplary embodiments of the invention are provided above the passenger seats 82. Details of the passenger service units 110 will be discussed further below with reference to FIG. 2B.

Usually, a single aircraft passenger reading light 2 is associated with each of the passenger seats 82, respectively. In particular, each aircraft passenger reading light 2 may be associated with one of the passenger seats 82 and may be configured for emitting a light output 40 towards the associated passenger seat 82

The light outputs 40 of the aircraft passenger reading lights 2 may be configured for providing sufficient illumination to each passenger seat 82, without providing unnecessary illumination of neighboring passenger seats 82.

In consequence, the specifics of the light output 40, in particular an opening angle α of a light cone, which is output by each aircraft passenger reading light 2, may de-pend on the distance between the aircraft passenger reading light 2 and the associated passenger seat 82. A smaller distance between the aircraft passenger reading light 2 and the associated passenger seat 82 may be dealt with via a larger opening angle α of the light output 40, and vice versa.

In order to allow for employing the same type of aircraft passenger reading lights 2 in different passenger cabins 104, in particular in passenger cabins 104 having different geometries and seat configurations, which result in different distances be-tween the aircraft passenger reading lights 2 and the respectively associated passenger seats 82, it may be desirable that the light outputs 40, provided by the air-craft passenger reading lights 2, are adjustable to different distances between the aircraft passenger reading lights 2 and the respectively associated passenger seats 82.

Figure 2B:
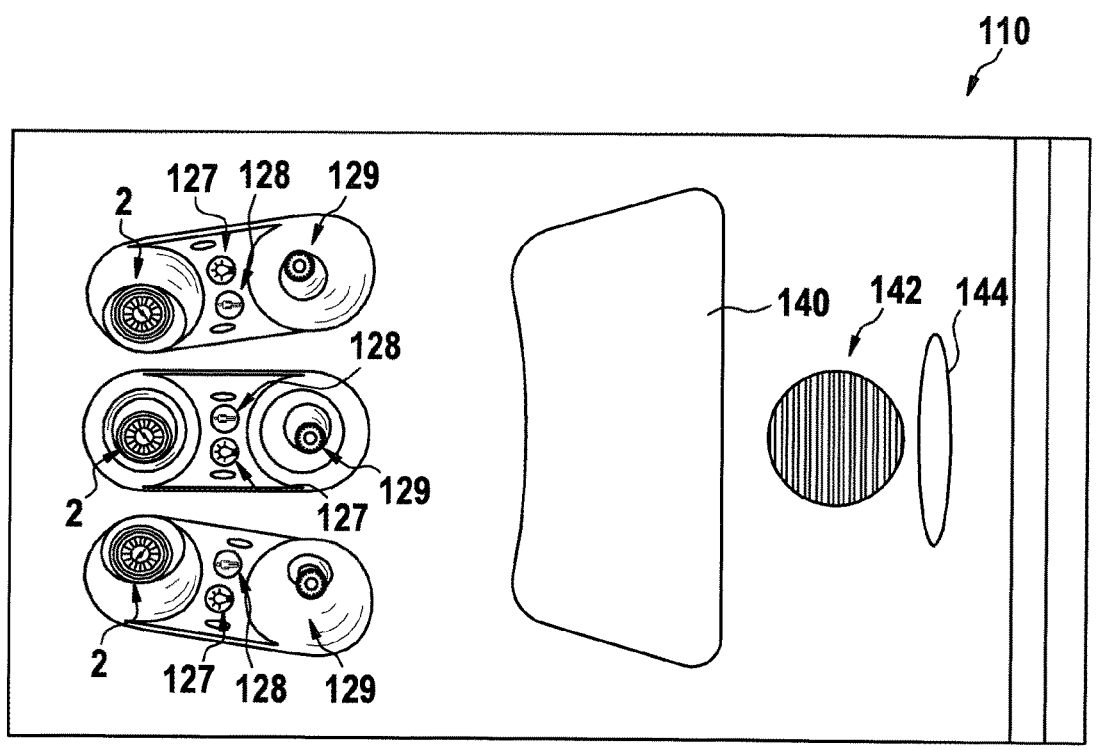
FIG. 2B depicts a schematic view of an overhead passenger service unit ("PSU"), comprising three aircraft passenger reading lights in accordance with exemplary embodiments of the invention.

FIG. 2B depicts a schematic view of an overhead passenger service unit ("PSU") 110 according to an exemplary embodiment of the invention, which may be arranged above the passenger seats 82 of a single seat row, as it is shown in FIG. 2A.

FIG. 2B depicts the overhead passenger service unit 110, as it is seen by a passenger sitting on a passenger seat 82 below the overhead passenger service unit 110.

On the side that is shown to the left in FIG. 2A, the overhead passenger service unit 110 comprises a row of three adjustable aircraft passenger reading lights 2, which are arranged next to each other.

Six electrical switches 127, 128 are provided to the right side of the aircraft passenger reading lights 2, a respective pair of two switches 127, 128 next to each of the aircraft passenger reading lights 2. A first one of the switches 127 of each pair is configured for switching the adjacent aircraft passenger reading light 2 on and off, and the second switch 128 of each pair is configured for triggering a signal for calling cabin service personnel.

A row of three adjacent gaspers 129 is provided next to the switches 127, 128.

Adjacent to the gaspers 129, there is a movable door 140, which covers a compartment housing at least three oxygen masks. The compartment and the oxygen masks are not visible in FIG. 2B, as they are covered by the movable door 140.

In the event of pressure loss within the passenger cabin 104, the movable door 140 will open, allowing the oxygen masks to drop out of the compartment. Each of the passengers sitting on a passenger seat 82 below the overhead passenger service unit 110 may grasp one of the oxygen masks. After being activated, an oxygen generator, which is not shown in the figures, will supply the oxygen masks with oxygen.

On the side opposite to the gaspers 129, a grid 142 is formed within the overhead passenger service unit 110. A loudspeaker (not shown), which may be used for delivering acoustic announcements to the passengers, may be arranged behind said grid 142.

Next to the grid 142, there is a display panel 144, which may be configured for selectively showing a plurality of visual signs (not shown), such as "non smoking" or "fasten your seat belt". The display panel 144 may be illuminated from behind, in order to deliver visual information to the passengers sitting on the passenger seats 82 below the overhead passenger service unit 110.

An exemplary embodiment of an aircraft passenger reading light 2, which allows adjusting its light output 40 to different distances between the aircraft passenger reading light 2 and the respectively associated passenger seat 82, will be described in the following with reference to FIGS. 3 to 8.

Figure 3:
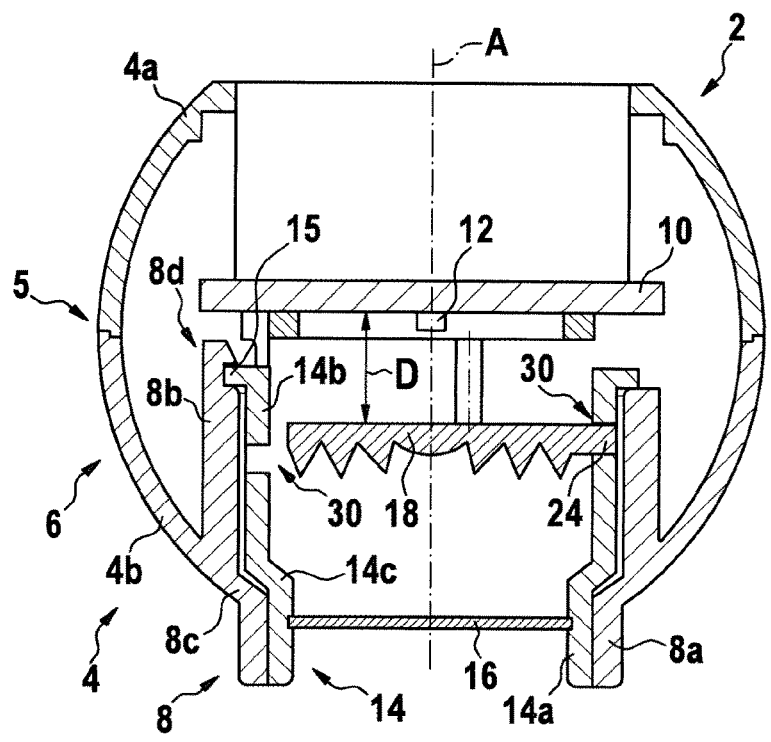
FIG. 3 depicts a cross-sectional view through an aircraft passenger reading light according to an exemplary embodiment of the invention.

FIG. 3 depicts a cross-sectional view through an aircraft passenger reading light 2 according to an exemplary embodiment of the invention.

The aircraft passenger reading light 2 comprises a housing 4, which includes two housing elements 4a, 4b, namely an upper housing element 4a and a lower housing element 4b. The upper and lower housing elements 4a, 4b are joined at an interface 5. The housing 4 has a ball-like shape, with a substantially spherical upper portion 6 and a tubular portion 8, extending from a lower end of the substantially spherical upper portion 6. The substantially spherical upper portion 6 of the housing 4 may be spherical, but it may also have another round/rounded shape, which does not need to be exactly spherical.

A light source support structure 10, which may be a light source support board 10, in particular a printed circuit board (PCB), is arranged within the housing 4. The light source support structure 10 supports a light source 12. The light source 12 may be an LED, or it may comprise at least one LED. The light source 12 may in particular comprise a plurality of LEDs.

The tubular portion 8 of the housing 4 comprises an outer portion 8a, which extends outwards from the substantially spherical upper portion 6 of the housing 4, and an inner portion 8b, which extends inwards towards the center of the housing 4. The outer portion 8a and the inner portion 8b are rotationally symmetric with respect to a common axis A.

In the embodiment depicted in the Figures, the diameter of the inner portion 8b of the tubular portion 8 is larger than the diameter of the outer portion 8a of the tubular portion 8. An inclined portion 8c connects the outer portion 8a with the inner portion 8b.

The diameter of the inner portion 8b of the tubular portion 8 may be in the range from 15 mm to 35 mm, in particular in the range from 20 mm to 30 mm, and the diameter of the outer portion 8a of the tubular portion 8 may be in the range from 10 mm to 30 mm, in particular in the range from 15 mm to 25 mm.

A tubular actuation member 14 is arranged within the tubular portion 8 of the housing 4. The tubular actuation member 14 is in particular arranged co-axially with the tubular portion 8 around the common axis A.

Similar to the tubular portion 8, the tubular actuation member 14 comprises an outer portion 14a, which is co-axially arranged within the outer portion 8a of the tubular portion 8, and an inner portion 14b, which is co-axially arranged within the inner portion 8b of the tubular portion 8. The inner portion 14b of the tubular actuation member 14 has a larger diameter than the outer portion 14a of the tubular actuation member 14.

An inclined portion 14c is formed between the inner and outer portions 14a, 14b of the tubular actuation member 14. The inclined portion 14c of the tubular actuation member 14 may extend along and about against the inclined portion 8c of the tubular portion 8.

The tubular actuation member 14 is rotatable with respect to the tubular portion 8 around the common axis A.

Any outward movement of the tubular actuation member 14 with respect to the tubular portion 8 along the axis A is prevented by the inclined portion 8c of the tubular portion 8, which abuts against the inclined portion 14c the tubular actuation member 14. Any inward movement of the tubular actuation member 14 with respect to the tubular portion 8 is prevented by at least one latch 8d, which is formed at an upper end of the inner portion 8b of the tubular portion 8. The at least one latch 8d engages with an inner end 15 of the inner portion 14b of the tubular actuation member 14.

Although only one latch 8d is visible in the cross-sectional view depicted in FIG. 3, the aircraft passenger reading light 2 may comprise a plurality of latches 8d, for ex-ample three latches 8d, which are arranged along the circumference of the inner portion 8b of the tubular portion 8 for reliably preventing any linear inward movement of the tubular actuation member 14 along the axis A. The latches 8d may be arranged with constant angular distances between adjacent latches 8d. In the case of three latches 8d, the angular distances between two adjacent latches 8d may in particular be 120°.

The outer portion 14a of the tubular actuation member 14 supports a light transmissive element 16, for example a cover lens 16, which is attached to the outer portion 14a of the tubular actuation member 14.

An optical element 18, in particular a lens 18, more particularly a Fresnel lens 18, is arranged within the upper portion 14b of the tubular actuation member 14. The optical element 18 may in particular have rotational symmetry with respect to the axis A.

The optical element 18 is linearly movable along the axis A by rotating the tubular actuation member 14 around the axis A. The rotating motion of the tubular actuation member 14 allows for varying the distance D between the optical element 18 and the light source 12, which is arranged stationary within the housing 4.

The distance D may in particular be changed within a range from 5 mm to 20 mm, in particular within a range from 8 mm to 15 mm. These values do not mean that all distances D between the lower and upper limit values have to be possible, i.e. that the whole range has to be covered by the different distances D. Rather, the given range is intended to indicate that the distances associated with the predetermined configurations of the aircraft passenger reading light are somewhere within the given range.

Varying the distance D between the optical element 18 and the light source 12 modifies the light output 40, which is emitted by the aircraft passenger reading light 2. Changing the distance D between the optical element 18 and the light source 12 may in particular allow for modifying the opening angle α of the light output 40.

In the following, a mechanical actuation mechanism 17, which allows for moving the optical element 18 along the axis A by rotating the tubular actuation member 14 and which may be implemented in aircraft passenger reading lights in accordance with exemplary embodiments of the invention, will be described.

Figure 4:
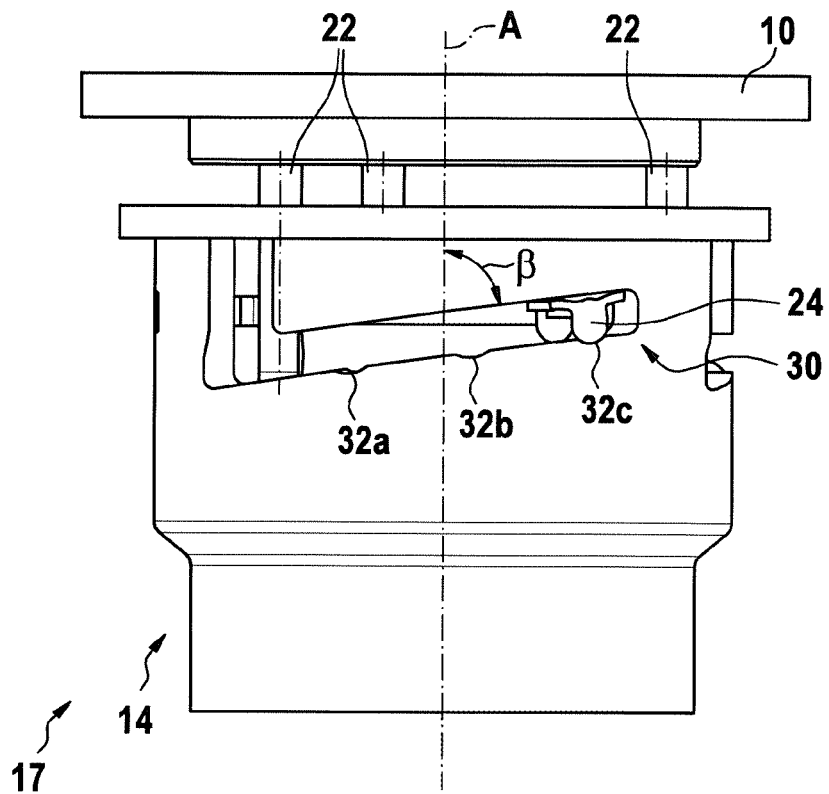
FIG. 4 depicts a side view of a tubular actuation member of an aircraft passenger reading light according to an exemplary embodiment of the invention.
Figure 5:
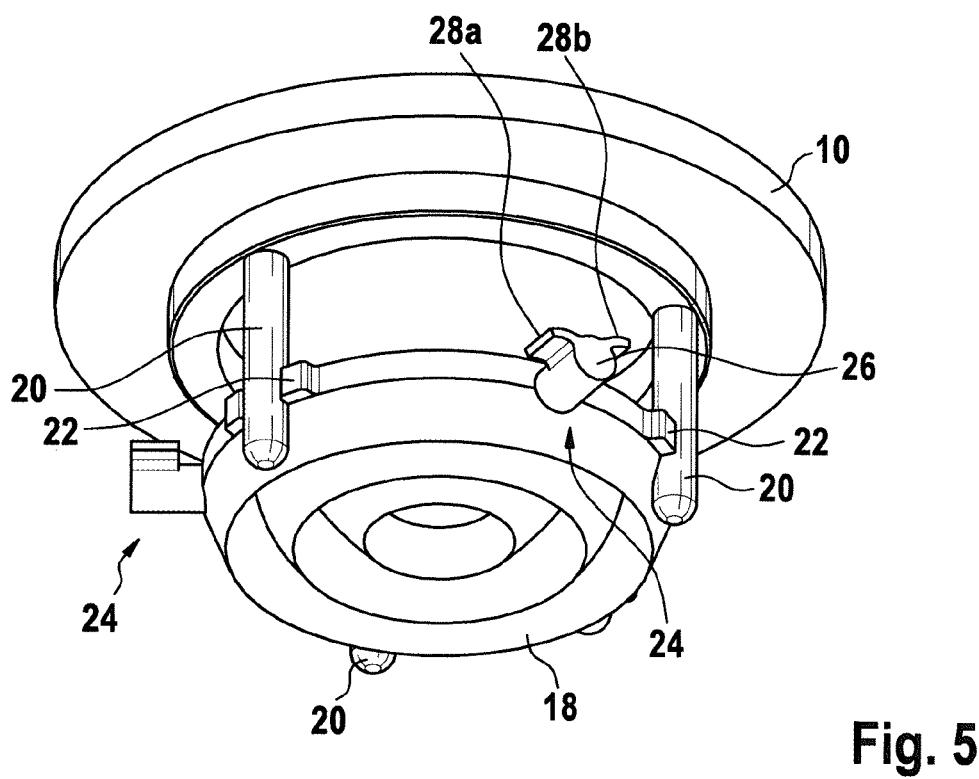
FIG. 5 depicts a perspective view of the inner mechanism of an aircraft passenger reading light according to an exemplary embodiment of the invention, with the tubular actuation member being removed.

FIG. 4 depicts a side view of the actuation mechanism 17, with the housing 4 being removed. FIG. 5 depicts a perspective view of the inner structure of the actuation mechanism 17, with the tubular actuation member 14, which is part of the actuation mechanism 17, being removed as well.

A plurality of longitudinal guide members 20, which may be provided as substantially cylindrical posts, extend orthogonally from the light source support board 10. The exemplary embodiment depicted in the Figures comprises three longitudinal guide members 20, which are arranged at equal angular distances of 120° between each other around the axis A. Embodiments comprising more or less than three longitudinal guide members 20 are possible as well.

Guiding structures 22, which correspond to the longitudinal guide members 20 are formed at the outer periphery of the optical element 18. The optical element 18 is in particular provided with three guiding structures 22. Each guiding structure 22 engages with a corresponding longitudinal guide member 20, forming a respective guiding assembly 20, 22. In case the aircraft passenger reading light 2 comprises more or less than three longitudinal guide members 20, the number of guiding structures 22 formed at the outer periphery of the optical element 18 is adjusted accordingly.

In the exemplary embodiment depicted in the Figures, each guiding structure 22 includes two guiding elements 22a, 22b, which are formed at the outer periphery of the optical element 18 so that a gap is formed between the two guiding elements 22a, 22b. One of the longitudinal guide members 20 extends though the gap formed between the two guiding elements 22a, 22b, respectively. As the longitudinal guide members 20 are fixed to the light source support board 10, the mechanical interaction between the longitudinal guide members 20 and the guiding structures 22 prevents a rotation of the optical element 18 with respect to the light source support structure 10 around the axis A.

In addition to the guiding structures 22, at least one guide member 24 is formed at the outer periphery of the optical element 18. In the exemplary embodiment depicted in the Figures, each of the guide members 24 comprises a cylindrical protrusion 26, which extends outwards from the outer periphery of the optical element 18 in a radial direction. Two wing-like extensions 28a, 28b are formed at the cylindrical protrusion 26. The wing-like extensions 28a, 28b are elastic and extend substantially perpendicular to the radial direction of the cylindrical protrusion 26.

As shown in FIG. 4, at least one slot 30 is formed within the circumferential wall of the inner portion 14b of the tubular actuation member 14. The at least one slot 30 is formed in an inclined orientation with respect to the axis A of the tubular actuation member 14. The at least one slot 30 may in particular be inclined at an angle ß in the range of between 75° and 85°, further in particular at an angle ß of 80°, with respect to the axis A.

The guide member 24 extends into said slot 30. Since the optical element 18, and in consequence also the guide member 24, are prevented from rotating around the axis A due to the interaction of the guiding structures 22 with the longitudinal guide members 20, the slot 30 moves relative to the guide member 24, when the tubular actuation member 14 is rotated around the axis A. Due to the inclination of the slot 30, the relative movement between the guide member 24 and the slot 30 generates a longitudinal motion of the tubular actuation member 14, i.e. a motion of the tubular actuation member 14 along the axis A. In the orientation of the aircraft passenger reading light 2 shown in the Figures, this motion is a vertical motion. In consequence, the optical element 18 is moved along the axis A, when the tubular actuation member 14 is rotated around the axis A.

As a result, the distance D between the optical element 18 and the light source 12 is variable by rotating the tubular actuation member 14 around its axis A. Thus, the actuation mechanism 17 is of a bayonet type, in which a rotational movement of the tubular actuation member 14 is transferred into a linear movement of the optical element 18.

A person that intends to rotate the tubular actuation member 14 for adjusting the distance D between the optical element 18 and the light source 12 may press his/her fingers against the outer portion 14a of the tubular actuation member 14 from inside the tubular actuation member 14 and may then rotate the tubular actuation member 14. As this procedure for rotating the tubular actuation member 14 is not obvious/intuitive to persons, who are not authorized and trained for rotating the tubular actuation member 14, the risk that the tubular actuation member 14 is rotated accidentally and/or in an unauthorized manner is very low.

In order to reduce the risk of an unauthorized rotation of the tubular actuation member 14 even further, the outer portion 14a of the tubular actuation member 14 may be configured such that it is rotatable only with a specific tool, which is given only to authorized personnel.

By varying the distance between the optical element 18 and the light source 12, the properties of the light output 40, which is emitted by the aircraft passenger reading light 2, is modified.

Figure 6A:
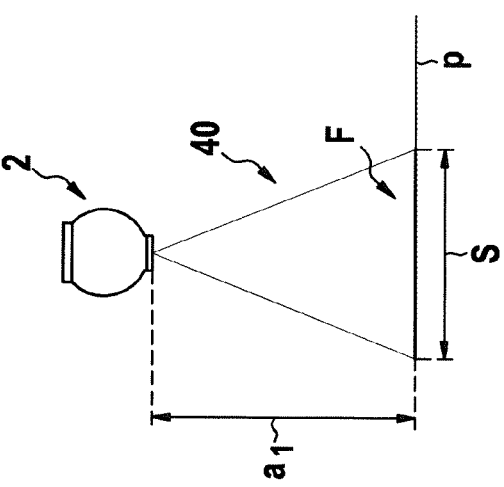
FIGS. 6A, 6B, and 6C illustrate the light outputs of an aircraft passenger reading light according to an exemplary embodiment of the invention in three different configurations.
Figure 6B:
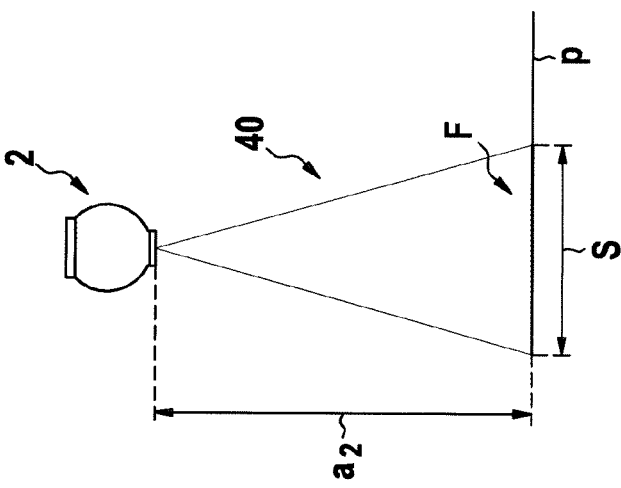
Figure 6C:
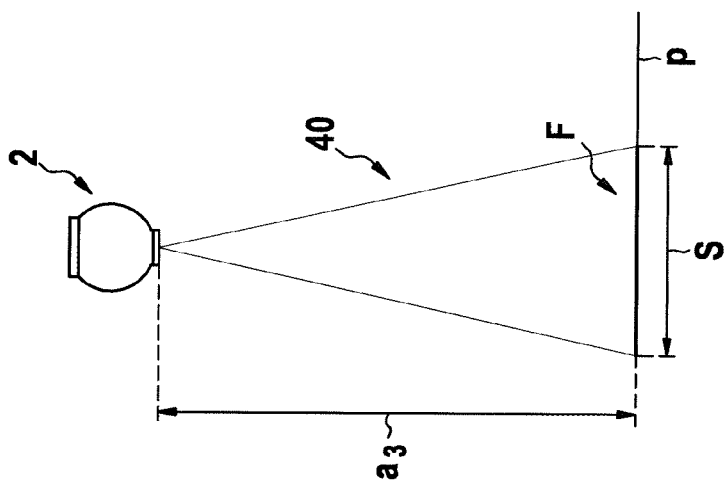

As it is illustrated in FIGS. 6A, 6B, and 6C, modifying the properties of the light output 40 may allow for changing the size S of an area F, which is illuminated by the light output 40, at a given distance from the aircraft passenger reading light 2. Stated differently, modifying the light output 40 may result in keeping the size S of an area F substantially constant, when changing the distance a1, a2, a3 between the aircraft passenger reading light 2 and an illumination plane P.

The illustration, which is given in FIGS. 6A, 6B, and 6C, is simplified for illustrative purposes. Usually, the illuminated area F does not have a sharp outer edge. Thus, the size S of the area F is defined as the size S of the portion of the plane P, which is illuminated by the aircraft passenger reading light 2 to at least a predefined brightness, i.e. to a brightness, which has been set to a predefined value. Said pre-defined value may, for example, be selected from in between 150 lx and 300 lx, in particular from in between 200 lx and 250 lx.

In other words, the outer peripheral boundary of the illuminated area F may be de-fined so that the brightness outside said boundary is below the predefined value and that the brightness inside said boundary is above the predefined value.

The illuminated area F, which is defined by said boundary, may be substantially circular having a diameter S, which may be in the range of between 40 cm and 70 cm, in particular in the range of between 50 cm and 60 cm.

The illuminated area F does not need to have a circular shape. The illuminated area F may also have an elliptical shape or a shape, which is similar to an elliptical shape, wherein the length of the major axis and the length of the minor axis are in the range of between 40 cm and 70 cm, in particular in the range of between 50 cm and 60 cm, respectively. Other shapes of the illuminated area F are possible as well.

Three different light outputs 40 of the aircraft passenger reading light 2, which correspond to three different distances D between the optical element 18 and the light source 2, are schematically illustrated in FIGS. 6A, 6B, and 6C.

Although in FIGS. 6A, 6B, and 6C the plane P is arranged in three different distances a1, a2, a3 from the aircraft passenger reading light 2, the size S of the area F, which is illuminated by the light output 40, is similar or identical in all three configurations.

Thus, the properties of the light output 40, which is emitted by the aircraft passenger reading light 2, may be adjusted to different distances a1, a2, a3 between the aircraft passenger reading light 2 and a corresponding passenger seat 82. In consequence, the same aircraft passenger reading light 2 may be used for different seating configurations in an aircraft passenger cabin 104 and in different aircraft passenger cabins 104.

The distances a1, a2, a3 between the aircraft passenger reading light 2 and the plane P may be in the range of between 50 cm and 250 cm, in particular in the range of between 100 cm and 200 cm, more particularly in the range of between 125 cm and 275 cm.

FIG. 4 further shows that a plurality of dents 32a, 32b, 32c are formed at different positions along the lower edge of the slot 30. The dents 32a, 32b, 32c are configured for accommodating the guide member 24. By accommodating the guide member 24, the dents 32a, 32b, 32c define predetermined positions of the guide member 24 within the slot 30. Each position of the guide member 24 corresponds to a predefined distance D between the optical element 18 and the light source 12, which in turn corresponds to a predetermined light output 40, as it has been de-scribed before.

Each position of the guide member 24 within the slot 30 and the corresponding light output 40 are associated with a predefined distance a1, a2, a3 between the aircraft passenger reading light 2 and the passenger seat 82, which is associated with the respective aircraft passenger reading light 2.

The elastic extensions 28a, 28b, formed at the cylindrical protrusion 26 of the guide member 24, elastically abut against the opposing edge of the slot 30, thereby pressing the cylindrical protrusion 26 elastically into the respective dent 32a, 32b, 32c.

In consequence, when the tubular actuation member 14 is arranged in one of the predefined rotational positions, in which the guide member 24 is accommodated in one of the dents 32a, 32b, 32c, a larger force needs to be applied for rotating the tubular actuation member 14 and moving the guide member 24 out of the respective dent 32a, 32b, 32c. Similarly, there is a tactile feedback to a person rotating the tubular actuation member 14, when the guide member "drops" into one of the dents 32a, 32b, 32c.

As a result, the distance D between the optical element 18 and the light source 12 may be modified easily and reliably between the predefined positions, which are defined by the dents 32a, 32b, 32c. Further, accommodating the guide member 24 within the dents 32a, 32b, 32c helps in reliably preventing an accidental movement of the tubular actuation member 14, which would result in an undesired modification of the optical properties of the light output 40 provided by the aircraft passenger reading light 2.

In the exemplary embodiment depicted in the Figures, the dents 32a, 32b, 32c are formed in a "lower" edge of the slot 30, i.e. in the edge of the slot 30 arranged on the side of the slot 30 facing the light output side of the aircraft passenger reading light 2, and the elastic extensions 28a, 28b are configured to abut against the op-posing "upper" edge of the slot 30, i.e. against the edge of the slot 30 arranged on the side of the slot 30 facing the light source 12.

In an alternative configuration, which is not explicitly shown in the figures, the dents 32a, 32b, 32c may be formed in the "upper" edge of the slot 30, and the elastic ex-tensions 28a, 28b may be configured to abut against the opposing "lower" edge of the slot 30.

The exemplary embodiment depicted in FIG. 4 comprises three dents 32a, 32b, 32c, which correspond to three different distances between the optical element 18 and the light source 12. Depending on the intended field of use of the aircraft passenger reading light 2, more or less than three dents 32a, 32b, 32c may be formed within the edge of the slot 30, in order to define more or less than three different optical configurations of the aircraft passenger reading light 2.

Only a single slot 30, which is formed within the tubular actuation member 14, and a single guide member 24, which is formed at the outer periphery of the optical element 18 and which extends into said slot 30, are visible in FIGS. 3 to 5.

In order to ensure a well-defined linear movement of the light source support board 10, in particular in order to reliably prevent any tilting of the light source support board 10, a plurality of slots 30 may be formed within the tubular actuation member 14. Correspondingly, a plurality of guide members 24, extending into said slots 30, may extend from the outer periphery of the optical element 18.

In particular, three identical slots 30, which may be formed at angular distances of 120° with respect to each other, may be formed within the peripheral wall of the tubular actuation member 14. Correspondingly, three guide members 24, which may in particular be formed at angular distances of 120° with respect to each other, may be provided at the outer circumference of the optical element 18. A configuration comprising three slots 30 and three corresponding guide members 24, wherein each of the three guide members 24 extends in one of the three slots 30, may result in a well-defined linear movement of the optical element 18. It may in particular prevent an undesired tiling or wiggling of the optical element 18 in a reliable manner.

Forming more than three slots 30 and more than three guide member 24, extending into said slots 30, could result in an over-determination of the spatial position and orientation of the optical element 18.

Figure 7:
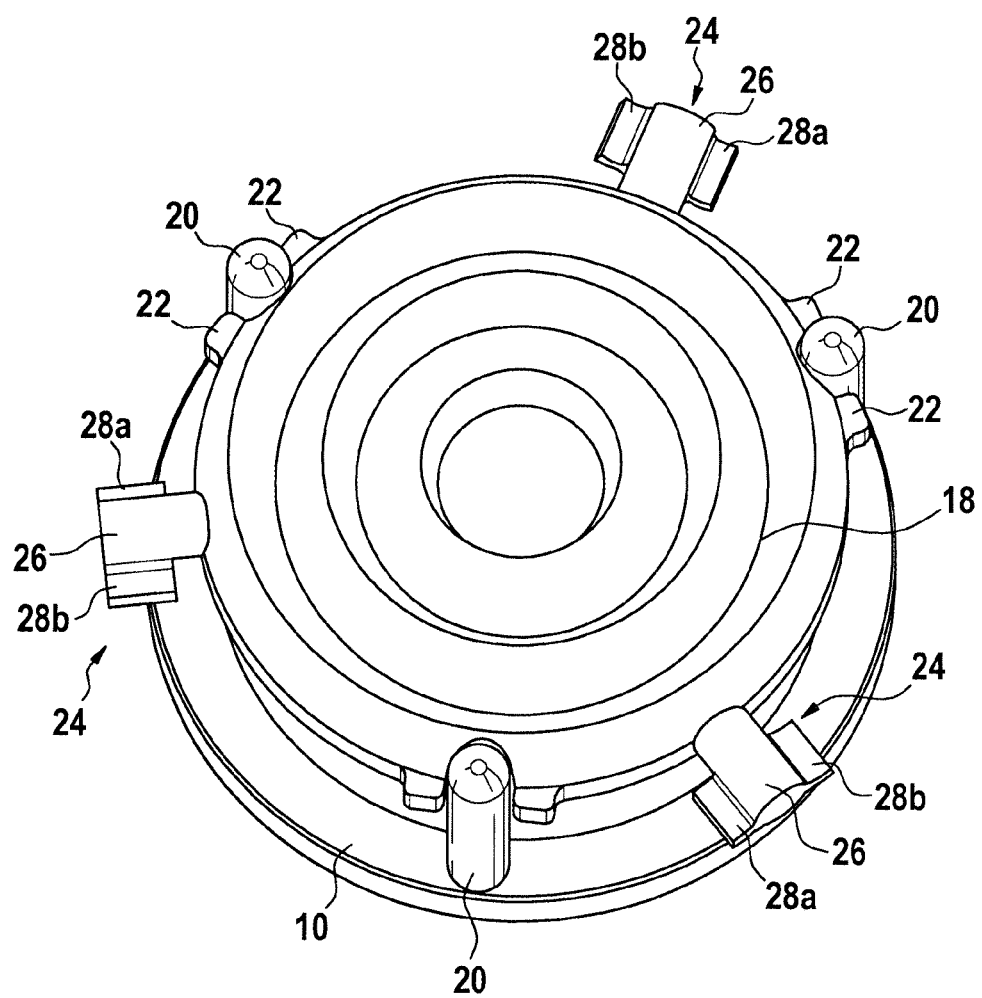
FIG. 7 depicts a perspective view of selected components of an aircraft passenger reading light according to an exemplary embodiment of the invention.

FIG. 7 depicts a perspective view of selected components of an aircraft passenger reading light in accordance with an exemplary embodiment of the invention from the light output side. The housing 4 and the tubular actuation member 14 have been removed for ease of view of the optical element 18 and its guiding components. FIG. 7 shows that three guide members 24 are provided on the outer circumference of the optical element 18. The three guide members 24 are spaced apart at angles of 120° from each other.

FIG. 7 further shows three guiding structures 22, which are also spaced apart at angles of 120° from each other along the outer circumference of the optical element 18. Each guiding structure 22 engages with a corresponding longitudinal guide member 20, which extends orthogonally from the light source support board 10.

Figure 8:
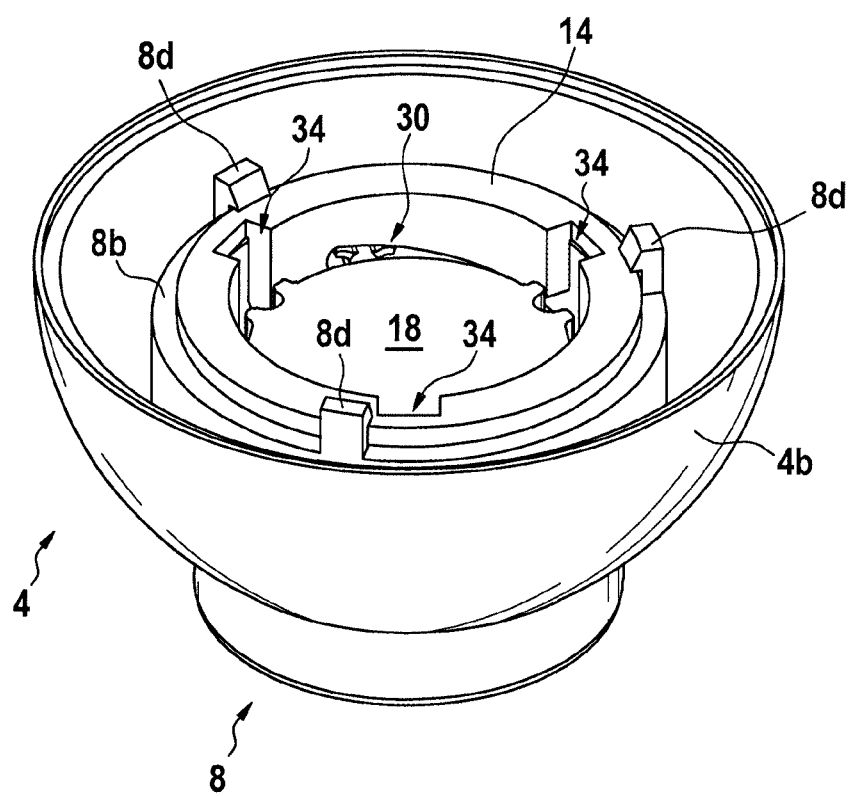
FIG. 8 depicts a perspective view into a lower housing element of an aircraft passenger reading light according to an exemplary embodiment of the invention, with the upper housing element of the aircraft passenger reading light being removed.

FIG. 8 depicts a perspective view into the lower housing element 4b of the housing 4 of an aircraft passenger reading light in accordance with an exemplary embodiment of the invention, with the upper housing element 4a being removed. In particular, FIG. 8 shows the tubular actuation member 14, which is arranged with-in the tubular portion 8 of the lower housing element 4b, and three latches 8d, which are formed at the upper end of the inner portion 8b of the tubular portion 8, in order to prevent the tubular actuation member 14 from moving upwards with respect to the tubular portion 8.

The movable optical element 18 is arranged within the tubular actuation member 14. One of the three slots 30, formed within the tubular actuation member 14, is visible in FIG. 8. The second and third slots 30 are not visible in FIG. 8 as they are covered by the tubular actuation member 14 and the tubular portion 8.

Three channels 34, which are also spaced apart from each other at 120°, are formed within the circumferential wall of the tubular actuation member 14. Each channel 34 is configured for accommodating a respective one of the longitudinal guide members 20 (cf. FIG. 7).

In the exemplary embodiment depicted in the Figures, the light source 12 remains stationary with respect to the housing 4, and the optical element 18 is movable with respect to the housing 4 and, thus, with respect to the at least one stationary light source 12.

In an alternative embodiment, which is not explicitly depicted in the Figures, the roles of the optical element 18 and the light source 12 may be exchanged, i.e. the optical element 18 may be stationary with respect to the housing 4 and the light source support board 10, which supports the light source 12, may be movable with respect to the optical element 18, in order to modify the distance D between the light source 12 and the optical element 18.

Configurations in which both the light source 12 and the optical element 18 are movable with respect to the housing 4, preferably in opposite directions, are possible as well.

In such a configuration, the tubular actuation member 14 may comprise a first group of slots, which are configured for moving the optical element 18, as it has been described before, and a second group of slots, which are inclined in an oppo-site manner as compared to the first group of slots and which are configured for interacting with the light source support structure 10 for moving the light source 12.

An aircraft passenger reading light according to an exemplary embodiment of the invention may also comprise a plurality of optical elements 18, which are movable collectively or individually with respect to the light source 12.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed:

1. An aircraft passenger reading light, which is operable in at least two predetermined configurations, the aircraft passenger reading light comprising:
    a light source;
    an optical element;
    an actuation mechanism, which is configured to modify a distance between the light source and the optical element; and
    a housing,
    wherein the distance between the light source and the optical element differs in the at least two predetermined configurations and wherein a spatial extension of the illumination, which results from the light output of the light source and the optical element, differs in the at least two predetermined configurations, and
    wherein the actuation mechanism includes an actuation member that is rotatable with respect to the housing, wherein the actuation member is mechanically coupled with the optical element and/or with the light source such that rotation of the actuation member modifies the distance between the light source and the optical element, wherein the actuation member includes a tubular actuation member, wherein the optical element and/or the light source is/are arranged at least partly within the tubular actuation member, and wherein the tubular actuation member is arranged in the housing, with the tubular actuation member being accessible only from inside the tubular actuation member.

2. The aircraft passenger reading light according to claim 1, wherein an opening angle ($\alpha$) of the light output of the light source and the optical element differs in the at least two predetermined configurations.

3. The aircraft passenger reading light according to claim 1, wherein rotation of the actuation member causes a linear movement of the optical element and/or of the light source in a longitudinal direction, wherein the axis of rotation (A) of the actuation member in particular coincides with said longitudinal direction.

4. The aircraft passenger reading light according to claim 1,
- wherein the tubular actuation member comprises a circumferential wall, and wherein a slot, which is inclined with respect to the longitudinal direction, is formed within the circumferential wall of the tubular actuation member, and
- wherein a guide member, which is mechanically coupled with the optical element or with the light source, extends into said slot, so that the guide member moves within the slot, when the tubular actuation member is rotated.

5. The aircraft passenger reading light according to claim 4, wherein the guide member is at least partially elastically deformable, wherein the guide member is in particular elastically deformed, when it is accommodated within the slot.

6. The aircraft passenger reading light according to claim 4, wherein at least two dents are formed at different positions along the slot for accommodating the guide member, wherein each dent corresponds to a respective one of the at least two predetermined configurations of the aircraft passenger reading light.

7. The aircraft passenger reading light according to claim 1, further comprising:
- at least one longitudinal guide member; and
- at least one corresponding guiding structure, provided at the optical element and/or at a support structure of the light source, for guiding the optical element and/or the support structure of the light source along the at least one longitudinal guide member and for preventing the optical element and/or the light source from rotating.

8. The aircraft passenger reading light according to claim 1, wherein the light source is an LED or wherein the light source includes one or more LEDs.

9. The aircraft passenger reading light according to claim 1, wherein the optical element includes at least one lens, wherein the optical element in particular includes at least one Fresnel lens.

10. A passenger service unit for a passenger aircraft, wherein the passenger service unit comprises at least one aircraft passenger reading light according to claim 1.

11. An aircraft, such as an airplane or a helicopter, comprising at least one aircraft passenger reading light according to claim 9.

12. An aircraft, such as an airplane or a helicopter, comprising at least one passenger service unit according to claim 10.

13. A method of adjusting a light output of an aircraft passenger reading light according to claim 1, wherein the method includes:
- changing the distance between the optical element and the light source from a first predetermined distance to a second predetermined distance via the actuation mechanism, in particular changing the distance between the optical element and the light source from the first predetermined distance to the second predetermined distance by rotating the actuation member with respect to the housing.

* * * * *